US012652605B2

(12) United States Patent
Li et al.

(10) Patent No.:    US 12,652,605 B2
(45) Date of Patent:       Jun. 9, 2026

(54) NETWORK ACCESS METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Haitao Li, Dongguan (CN); Yi Hu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 529 days.

(21) Appl. No.: 18/091,969

(22) Filed: Dec. 30, 2022

(65) Prior Publication Data

US 2023/0224797 A1      Jul. 13, 2023

Related U.S. Application Data

(63) Continuation of application No. PCT/CN2020/121901, filed on Oct. 19, 2020.

(51) Int. Cl.
*H04W 48/02*        (2009.01)
*H04W 8/22*         (2009.01)

(52) U.S. Cl.
CPC ............. *H04W 48/02* (2013.01); *H04W 8/22* (2013.01)

(58) Field of Classification Search
CPC ..... H04W 48/02; H04W 8/22; H04W 36/362; H04W 88/08; H04W 36/0079
See application file for complete search history.

(56) References Cited

U.S. PATENT DOCUMENTS

| | | | |
|---|---|---|---|
| 2016/0381713 A1 | 12/2016 | Hwang | |
| 2020/0389825 A1* | 12/2020 | Higuchi | H04W 36/362 |
| 2023/0074373 A1* | 3/2023 | Jatunov | G01S 11/02 |

FOREIGN PATENT DOCUMENTS

| | | |
|---|---|---|
| CN | 105120496 A | 12/2015 |
| CN | 110463258 A | 11/2019 |
| CN | 110769480 A | 2/2020 |

(Continued)

OTHER PUBLICATIONS

Communication pursuant to Article 94(3) EPC issued in corresponding European Application No. 20957953.1, mailed Oct. 17, 2024, 16 pages.

(Continued)

*Primary Examiner* — Anez C Ebrahim
(74) *Attorney, Agent, or Firm* — BAYES PLLC

(57)        ABSTRACT

A network access method, a terminal device, and a network device. The method comprises: a terminal device receiving a plurality of pieces of first indication information sent by a network device, wherein each piece of first indication information in the plurality of pieces of first indication information corresponds to at least one of a plurality of reduced capability terminal types, and each piece of first indication information is used for indicating whether a terminal device of the corresponding reduced capability terminal type is prohibited from accessing a cell that the network device serves; and the terminal device determining, according to the first indication information corresponding to the reduced capability terminal type to which the terminal device belongs, whether to prohibit the terminal device from accessing the cell that the network device serves.

20 Claims, 6 Drawing Sheets

(56)               References Cited

FOREIGN PATENT DOCUMENTS

| CN | 111345072 A | 6/2020 |
| CN | 108605266 B | 9/2020 |
| CN | 111918359 A | 11/2020 |
| EP | 4178268 A1 | 5/2023 |
| WO | 2019232757 A1 | 12/2019 |

OTHER PUBLICATIONS

Partial European Search Report issued in corresponding European application No. 20957953.1, mailed Nov. 2, 2023.
Extended European Search Report issued in corresponding European application No. 20957953.1, mailed Jan. 23, 2024.
Source: OPPO; Title: Discussion on RedCap UE's identification and access control 3GPP TSG-RAN WG2 Meeting #111-e R2-2006786 Electronic, Aug. 17-28, 2020.
Source: OPPO; Title: Discussion on definition of RedCap UEs 3GPP TSG-RAN WG2 Meeting #111-e R2-2006785 Electronic, Aug. 17-28, 2020.
3GPP TS 38.331 V15.11.0 (Sep. 2020);3rd Generation Partnership Project;Technical Specification Group Radio Access Network; NR;Radio Resource Control (RRC) protocol specification(Release 15).
Source: vivo, Guangdong Genius; Title: Identification and Access Restrictions for RedCap UEs 3GPP TSG-RAN WG2 Meeting #111-e R2-2006692 Electronic, Aug. 17-Aug. 28, 2020.
Source: Intel Corporation; Title: Framework and principles for introduction of RedCap UEs 3GPP TSG RAN WG1 Meeting #102-E R1-2007950 e-Meeting, Oct. 26-Nov. 13, 2020.
International Search Report issued in International application No. PCT/CN2020/121901, mailed Jul. 8, 2021, 5 pages.
Written Opinion of the International Searching Authority issued in International application No. PCT/CN2020/121901, mailed Jul. 8, 2021, 10 pages.
3GPP TSG RAN Meeting #86 RP-193238, Sitges, Spain, Dec. 9-12, 2019, "New SID on support of reduced capability NR devices", Source: Ericsson, Agenda Item: 9.1.1, 5 pages.
Summons to attend oral proceedings pursuant to Rule 115(1) EPC issued in corresponding European Application No. 20957953.1, mailed Apr. 11, 2025, 22 pages.

* cited by examiner

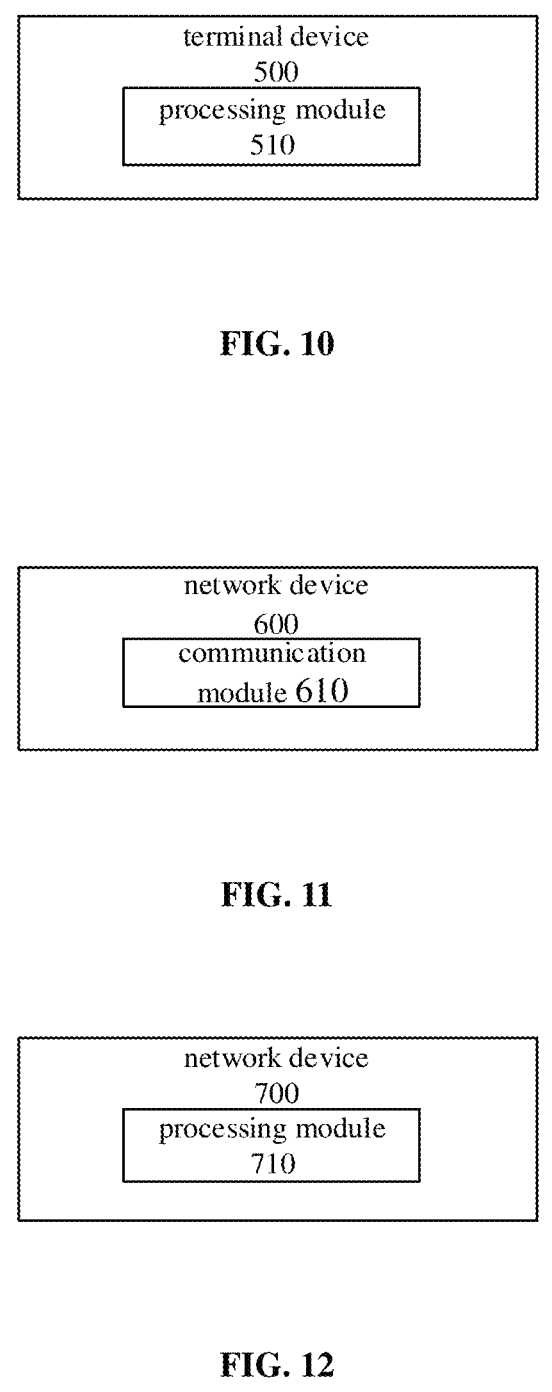

100 terminal device
500 processing module
510

FIG. 10 network device
600 communication
module 610

FIG. 11 network device
700 processing module
710

FIG. 12

NETWORK ACCESS METHOD, TERMINAL DEVICE, AND NETWORK DEVICE

CROSS REFERENCE

The present application is a continuation of International Application No. PCT/CN2020/121901, filed on Oct. 19, 2020, and the entire contents thereof are incorporated herein by reference.

TECHNICAL FIELD

The embodiment of the present application relates to the communication field, and specifically relates to a network access method, a terminal device, and a network device.

BACKGROUND

In the communication system, in order to control the load of the network equipment, the network equipment can broadcast a cell barred (cellBarred) information to control the access of all terminal equipment.

In some scenarios, a reduced capability (RedCap) terminal is introduced for scenarios with lower performance requirements such as latency, reliability, bandwidth, coverage, and throughput.

SUMMARY

The present application provides a network access method, a terminal device and a network device.

In a first aspect, a network access method is provided, including: receiving, by a terminal device, a plurality pieces of first indication information sent by a network device, wherein each piece of first indication information in the plurality pieces of first indication information corresponds to at least one of a plurality of reduced capability terminal types, each of the first indication information is used to indicate whether the terminal device of a corresponding reduced capability terminal type is prohibited from accessing a cell served by the network device; and determining, by terminal device, whether to prohibit the terminal device from accessing the cell served by the network device according to the first indication information corresponding to the reduced capability terminal type to which the terminal device belongs.

In a second aspect, a network access method is provided, including: determining, by a terminal device, whether to prohibit the terminal device from accessing a cell served by a network device according to whether first resource configuration information sent by the network device is received, wherein, the terminal device belongs to a first reduced capability terminal type among a plurality of reduced capability terminal types, the plurality of reduced capability terminal types correspond to a plurality pieces of resource configuration information, and each piece of resource configuration information in the plurality pieces of resource configuration information corresponds to at least one of the plurality of reduced capability terminal types, and the first resource configuration information is resource configuration information corresponding to the first reduced capability terminal type.

In a third aspect, a network access method is provided, including: sending, by a network device, a plurality pieces of first indication information, wherein each piece of first indication information in the plurality pieces of first indication information corresponds to at least one of a plurality of reduced capability terminal types, and the first indication information is used to indicate whether a terminal device of a corresponding reduced capability terminal type is prohibited from accessing a cell served by the network device.

In a fourth aspect, a network access method is provided, including: indicating, by a network device, whether to prohibit a terminal device of a first reduced capability terminal type from accessing a cell served by the network device by sending or not sending first resource configuration information, wherein the first resource configuration information is one of a plurality pieces of resource configuration information, the plurality pieces of resource configuration information correspond to a plurality of reduced capability terminal types, and each piece of resource configuration information in the plurality pieces of resource configuration information corresponds to at least one of the plurality of reduced capability terminal types, and the first resource configuration information is resource configuration information corresponding to the first reduced capability terminal type.

In a fifth aspect, a terminal device is provided, configured to execute the method in the above first aspect to the second aspect or each implementation manner thereof. Specifically, the terminal device includes a functional module for executing the methods in the above first aspect to the second aspect or their respective implementation manners.

In a sixth aspect, a network device is provided, configured to execute the method in the third aspect to the fourth aspect or implementation manners thereof. Specifically, the network device includes a functional module for executing the method in the third aspect to the fourth aspect or implementation manners thereof.

In a seventh aspect, a terminal device is provided, including a processor and a memory. The memory is used to store a computer program, and the processor is used to call and run the computer program stored in the memory, and execute the method in the first aspect to the second aspect or implementations thereof.

In an eighth aspect, a network device is provided, including a processor and a memory. The memory is used to store a computer program, and the processor is used to call and run the computer program stored in the memory, and execute the method in the above third aspect to the fourth aspect or each implementation manner thereof.

In a ninth aspect, a chip is provided, configured to implement the method in any one of the foregoing first to fourth aspects or the method in each implementation manner thereof. Specifically, the chip includes: a processor, configured to call and run a computer program from a memory, so that the device installed with the chip executes the method in any one of the above-mentioned first to fourth aspects or any of the implementations thereof.

In a tenth aspect, there is provided a computer-readable storage medium for storing a computer program, and the computer program causes a computer to execute the method in any one of the above-mentioned first to fourth aspects or the method in each implementation manner thereof.

In an eleventh aspect, a computer program product is provided, including computer program instructions, the computer program instructions causing a computer to execute the method in any one of the above first to fourth aspects or the method in each implementation manner thereof.

A twelfth aspect provides a computer program that, when running on a computer, causes the computer to execute the method in any one of the above first to fourth aspects or the method in each implementation manner.

BRIEF DESCRIPTION OF THE DRAWINGS

FIG. 10 is a schematic block diagram of a terminal device according to another embodiment of the present application.

FIG. 11 is a schematic block diagram of a network device according to an embodiment of the present application.

FIG. 12 is a schematic block diagram of a network device according to another embodiment of the present application.

DETAILED DESCRIPTION

Figure 1:
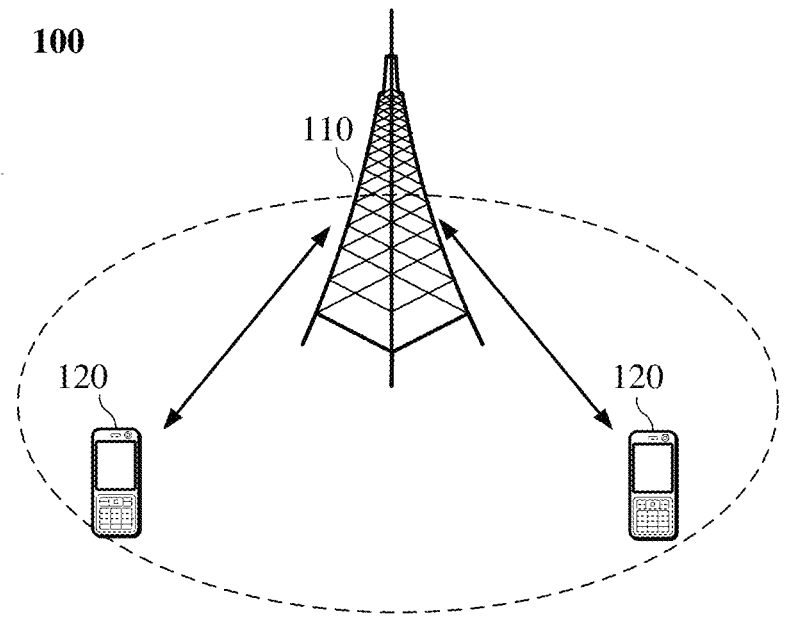
FIG. 1 is a schematic diagram of a communication system architecture provided by an embodiment of the present application.

Hereinafter, the technical solutions in the embodiments of the present application will be described with reference to the drawings in the embodiments of the present application. Obviously, the described embodiments are part of the embodiments of the present application, but not all of the embodiments. With regard to the embodiments in this application, all other embodiments obtained by persons of ordinary skill in the art without making creative efforts belong to the scope of protection of this application.

The technical solutions of the embodiments of the present application can be applied to various communication systems, for example: Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, New Radio (NR) system, LTE-based access to unlicensed spectrum, (LTE-U) system, NR-based access to unlicensed spectrum (NR-U) system, Non-Terrestrial Networks (NTN) system, Universal Mobile Telecommunications System (UMTS), Wireless Local Area Networks (WLAN), Wireless Fidelity (WiFi), fifth-generation communication (5th-Generation, 5G) system or other communication systems, etc.

Generally speaking, the number of connections supported by traditional communication systems is limited and easy to implement. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc., the embodiments of the present application may also be applied to these communication systems.

Optionally, the communication system in the embodiment of the present application can be applied to a carrier aggregation (CA) scenario, a dual connectivity (DC) scenario, or a standalone (SA) deployment scene.

Optionally, the communication system in the embodiment of the present application may be applied to an unlicensed spectrum, wherein the unlicensed spectrum may also be considered as a shared spectrum; or, the communication system in the embodiment of the present application may also be applied to a licensed spectrum, wherein, the licensed spectrum can also be considered as non-shared spectrum.

The embodiments of the present application describe various embodiments in conjunction with network device and terminal device, wherein the terminal device may also be referred to as user equipment (UE), access terminal, user unit, user station, mobile station, mobile site, remote station, remote terminal, mobile device, user terminal, terminal, wireless communication device, user agent or user device, etc.

The terminal device can be a station (ST) in a WLAN, a cellular phone, a cordless phone, a Session Initiation Protocol (SIP) phone, a Wireless Local Loop (WLL) station, a Personal Digital Assistant (PDA) device, handheld devices with wireless communication functions, computing devices or other processing devices connected to wireless modems, vehicle-mounted devices, wearable devices, next-generation communication systems such as terminal devices in NR networks, or the terminal device in a future evolved public land mobile network (PLMN) network, etc.

In the embodiment of this application, the terminal device can be deployed on land, including indoor or outdoor, handheld, wearable or vehicle-mounted; the terminal device can also be deployed on water (such as ships, etc.); the terminal device can also be deployed in the air (such as aircraft, balloons and satellites).

In this embodiment of the application, the terminal device may be a mobile phone, a tablet computer (Pad), a computer with a wireless transceiver function, a virtual reality (VR) terminal device, an augmented reality (AR) terminal device, wireless terminal devices in industrial control, wireless terminal devices in self driving, wireless terminal devices in remote medical, wireless terminal devices in smart grid, wireless terminal device in transportation safety, wireless terminal device in smart city, or wireless terminal device in smart home.

As an example but not a limitation, in this embodiment of the present application, the terminal device may also be a wearable device. Wearable devices can also be called wearable smart devices, which is a general term for the application of wearable technology to intelligently design daily wear and develop wearable devices, such as glasses, gloves, watches, clothing and shoes. A wearable device is a portable device that is worn directly on the body or integrated into the user's clothing or accessories. Wearable devices are not only a hardware device, but also achieve powerful functions through software support, data interaction, and cloud interaction. Generalized wearable smart devices include those of full-featured, large-sized, complete or partial functions without relying on smart phones, such as smart watches or smart glasses, etc., and those only focus on a certain type of application functions, and need to cooperate with other devices such as smart phones, such as various smart bracelets and smart jewelry for physical sign monitoring.

In the embodiment of this application, the network device may be a device used to communicate with mobile devices, and the network device may be an access point (AP) in WLAN, a base transceiver station (BTS) in GSM or CDMA, or a base station (NodeB, NB) in WCDMA, or an evolved base station (Evolutional Node B, eNB or eNodeB) in LTE, or a relay station or an access point, or a vehicle-mounted device, a wearable device, and a network device (gNB) in an NR network, or the network device in the future evolution of the PLMN network or the network device in the NTN network, etc.

As an example but not a limitation, in this embodiment of the present application, the network device may have a mobile feature, for example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station installed on land, water, and other locations.

In this embodiment of the application, the network device may provide services for a cell, and the terminal device communicates with the network device through the transmission resources (for example, frequency domain resources, or spectrum resources) used by the cell. The cell may be a cell corresponding to a network device (e.g., a base station), the cell may belong to a macro base station, or a base station corresponding to a small cell, wherein the small cell may include: Metro cell, Micro cell, Pico cell, Femto cell, etc. These small cells have the characteristics of small coverage and low transmission power, and are suitable for providing high-speed data transmission services.

Exemplarily, a communication system 100 applied in this embodiment of the application is shown in FIG. 1. The communication system 100 may include a network device 110, and the network device 110 may be a device for communicating with a terminal device 120 (or called a communication terminal, terminal). The network device 110 can provide communication coverage for a specific geographical area, and can communicate with terminal devices located in the coverage area.

FIG. 1 exemplarily shows one network device and two terminal devices. Optionally, the communication system 100 may include multiple network devices and each network device may include other numbers of terminal devices within the coverage area, which is not limited by the embodiment of the application.

Optionally, the communication system 100 may further include other network entities such as a network controller and a mobility management entity, which is not limited in this embodiment of the present application.

It should be understood that a device with a communication function in the network/system in the embodiment of the present application may be referred to as a communication device. Taking the communication system 100 shown in FIG. 1 as an example, the communication equipment may include network device 110 and terminal device 120 with communication functions, which may be the specific devices discussed above and will not be repeated herein. The communication equipment may include other devices in the communication system 100, such as network controllers, mobility management entities and other network entities, which are not limited in this embodiment of the present application.

It should be understood that the terms "system" and "network" are often used interchangeably herein. The term "and/or" in this article is just an association relationship describing associated objects, which means that there can be three relationships, for example, A and/or B can mean these three situations: A exists alone, A and B exist simultaneously, and B exists alone. In addition, the character "/" in this article generally indicates that the contextual objects are an "or" relationship.

It should be understood that the "indication" mentioned in the embodiments of the present application may be a direct indication, may also be an indirect indication, and may also mean that there is an association relationship. For example, A indicates B, which can mean that A directly indicates B, for example, B can be obtained through A; it can also indicate that A indirectly indicates B, for example, A indicates C, and B can be obtained through C; it can also indicate that there is an association relation between A and B.

In the description of the embodiments of the present application, the term "corresponding" may indicate that there is a direct or indirect correspondence between the two, or that there is an association between the two, or the relation of indicating and being indicated, configuring and being configured, or the like.

It should be understood that in this embodiment of the application, NR can also be deployed independently. In order to reduce air interface signaling and quickly restore wireless connections and data services in the 5G network environment, a new radio resource control (RRC) state, that is, RRC_INACTIVE (inactive) state, is defined. This state is different from RRC_IDLE (idle) state and RRC_CONNECTED (connected) state.

In the RRC_IDLE state: mobility is cell selection and reselection based on terminal device, paging is initiated by the core network (CN), and the paging area is configured by the CN. There is no terminal device access stratum (AS) context and no RRC connection on the base station side.

In the RRC_CONNECTED state: there is an RRC connection, and a terminal device AS context exists on the base station and the terminal device. The network device knows that the location of the terminal device is at the specific cell level. Mobility is the mobility controlled by the network device. Unicast data can be transmitted between the terminal device and the base station.

RRC_INACTIVE state: mobility is cell selection and reselection based on terminal device, a connection between CN-NR exists, terminal device AS context exists on a certain base station, paging is triggered by radio access network (RAN), the RAN-based paging area is managed by the RAN, and the network device knows the location of the terminal device is based on the RAN-based paging area level.

It should be noted that, in the embodiment of the present application, the inactive state may also be referred to as the deactivated state, which is not limited in the present application.

Figure 2:
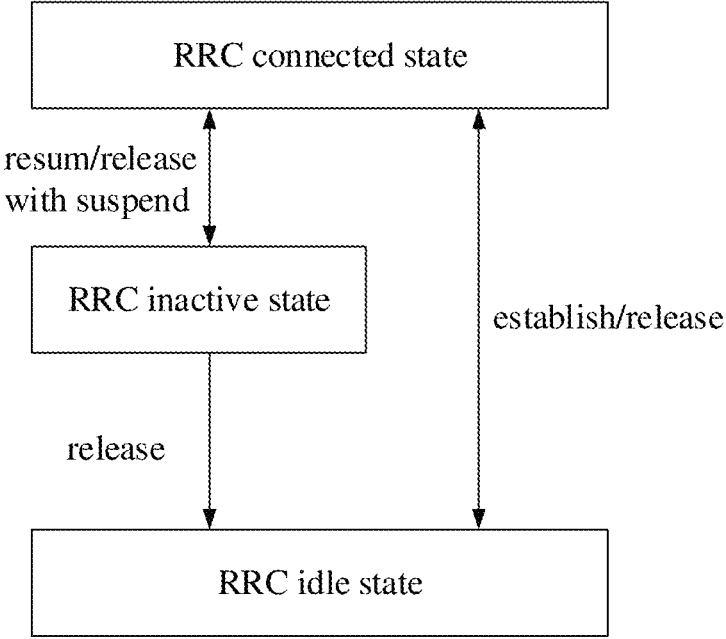
FIG. 2 is a schematic diagram of a state transition of a terminal device provided by the present application.

The network device can control the state transition of the terminal device. For example, as shown in FIG. 2, the terminal device in the RRC_CONNECTED state can enter the RRC_IDLE state by releasing the RRC connection; the terminal device in the RRC_IDLE state can enter the RRC_CONNECTED state by establishing an RRC connection; and the UE in the RRC_CONNECTED state can enter the RRC_INACTIVE state by suspending and releasing the RRC connection (Release with Suspend); and the UE in the RRC_INACTIVE state can enter the RRC_CONNECTED state by resuming the RRC connection, or enter the RRC_IDLE state by releasing the RRC connection.

It should be noted that the terminal device in the RRC_I-NACTIVE state, automatically returns to the idle state in the following situations:

When the initial paging message of the CN is received;

When initiating the RRC recovery request, the timer T319 is started, and if the timer expires;

When contention-based random access message 4 (Message4, MSG4) integrity protection verification fails;

When the cell resection to other radio access technology (RAT); and

Enter the camp on any cell state.

Characteristics of the RRC_INACTIVE state:

The connection between RAN and CN is maintained;

The terminal device and at least one gNB maintain the AS context;

The terminal device is reachable to the RAN side, and the relevant parameter is configured by the RAN;

The terminal device does not need to notify the network side (core network device) when the terminal device movies within the RAN notification area (RNA) configured by the RAN, while it needs to notify the network side (core network device) when moving out of the RNA; and The UE moves within the RNA according to the cell selection-reselection approach.

Figure 3:
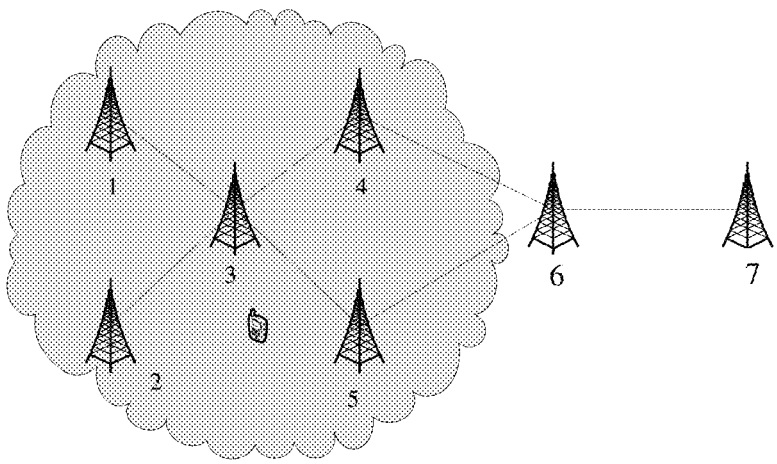
FIG. 3 is a schematic diagram of an inactive state terminal device RNA provided by the present application.

It should be noted that the RNA can be specifically shown in FIG. 3. In the RNA shown in FIG. 3, when the terminal device moves among base station 1 to base station 5, it is not necessary to notify the network side, while the terminal device needs to notify the network side when moving to the base station 6 or base station 7.

In Release 17 (R17), the RedCap Terminal, or referred to as the RedCap device, is introduced for scenarios with lower performance requirements. For example but not limited to the following scenarios:

Scenario 1: industrial wireless sensors, compared with ultra-reliable and low latency communication (URLLC) terminals, industrial wireless sensors have relatively low latency and reliability requirements. Moreover, the device cost and power consumption are also lower than URLLC terminals and enhanced mobile broadband (eMBB) terminals.

Scenario 2: video surveillance, which can be used in video surveillance in scenarios such as smart cities and industrial processes. In the smart city scenario, the equipment is mainly used for data collection and processing, so as to realize more effective monitoring and control of urban resources and provide more effective services to urban residents.

Scenario 3: wearables. Examples include but are not limited to smart watches, rings, electronic health equipment, medical monitoring equipment, etc. These devices are usually smaller in size.

Therefore, the above scenarios may have the following common requirements:

1. Equipment cost, compared with version 15/16 (R15/16) eMBB terminals, the requirements for equipment cost and complexity are lower.

2. Equipment size, smaller equipment size is required.

3. Coverage, coverage equivalent or similar to that of R15/16 eMBB terminals is required. In this case, if reducing the receiving antenna, reducing the bandwidth, reducing the power level or other reductions in UE complexity lead to coverage loss, corresponding compensation needs to be performed.

For the above three scenarios, there is another scenario with different requirements, and the performance requirements are as follows:

For Scenario 1: The reliability requirement is 99.99%, the end-to-end latency is 100 ms, the bit rate requirement is 2 Mbps, the device is stationary, and the battery life is several years. Optionally, for safety-related sensors, the latency requirement may be 5-10 ms.

For Scenario 2: The bit rate requirement is 2-4 Mbps, the latency requirement is less than 500 ms, and the reliability requirement is 99.-99.9%. The volume of uplink traffic is relatively large. For high-end video, the rate requirement is 2-4 Mbps.

For scenario 3: Reference may be made to the requirements of access category 4 in the LTE system, and the rate requirement is 150 Mbps/50 Mbps.

In the NR system, the network device can broadcast a cell barred (cellBarred) information through the master information block (MIB) in the system message, which is used to indicate whether the current cell prohibits all UEs from accessing. If cellBarred indicates barred, the terminal device will perform cell reselection.

When RedCap terminals are introduced and the requirements of terminals with reduced capabilities are different, using unified cellBarred information for access control is not conducive to flexible control of terminal devices. Therefore, how to perform more refined access control for terminals with reduced capabilities is a problem that urgently needs to be solved.

In order to facilitate understanding of the technical solutions of the embodiments of the present application, the technical solutions of the present application are described in detail below through specific examples. The following related technologies may be optionally combined with the technical solutions of the embodiments of the present application as optional solutions, and all of them belong to the protection scope of the embodiments of the present application. The embodiment of the present application includes at least part of the following content.

Figure 4:
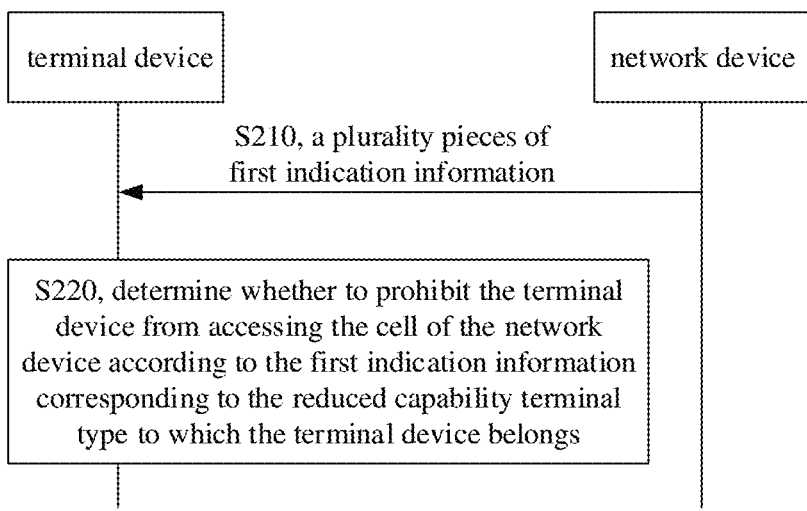
FIG. 4 is a schematic interaction diagram of a network access method according to an embodiment of the present application.

FIG. 4 is a schematic interaction diagram of a method 200 for accessing a network according to an embodiment of the present application. As shown in FIG. 4, the method 200 includes the following content:

S210, the network device sends a plurality pieces of first indication information.

Correspondingly, the terminal device receives the plurality pieces of first indication information.

In this embodiment of the present application, the plurality pieces of first indication information are used for access control of a plurality of reduced capability terminal types, wherein each piece of first indication information in the plurality pieces of first indication information corresponds to At least one of the plurality of reduced capability terminal types. That is, each piece of first indication information may be used for access control of at least one reduced capability terminal type, and each piece of first indication information is used to indicate whether to prohibit a terminal device of the corresponding reduced capability terminal type to access the cell served by the network device.

S220, the terminal device determines whether to prohibit the terminal device from accessing the cell served by the network device according to the first indication information corresponding to the reduced capability terminal type to which the terminal device belongs.

Optionally, in some embodiments, the content indicated by the first indication information may be barred or not barred, for example.

It should be understood that the embodiment of the present application does not limit the bearing manner of the plurality pieces of first indication information, for example, it may be multiple pieces of independent information, or may also be included in one piece of information, for example, the plurality pieces of first indication information can be a plurality of bits in one piece of information. As an example, each bit corresponds to a first indication information, and the plurality of bits can indicate whether to prohibit the terminal device of the corresponding reduced capability terminal type to access the cell served by the network through a bitmap (bitmap) method.

It should be noted that, in this embodiment of the application, a terminal with reduced capability may refer to a type of terminal with lower capability, or a type of terminal with lower performance requirements such as delay, reliability, bandwidth, coverage, and throughput, or a type of terminal applied to a specific scenario, such as the terminals in the aforementioned three scenarios.

In the embodiment of the present application, the terminal with reduced capability can be classified into multiple types of terminal with reduced capability, and further the network device can perform independent access control on the multiple types of terminal with reduced capability based on multiple pieces of indication information, which is beneficial to realize the fine-grained access control for reduced capability terminals.

It should be understood that the network device may perform separate fine-grained access control on the terminal with reduced capabilities through the plurality pieces of first indication information, and in other embodiments, the network device may also use a similar manner to perform independent access control to other terminal device that needs differentiate (or in other words, independent) access control. For example, independent access control is performed for terminals with enhanced capabilities, and the terminals with enhanced capabilities can be, for example, the type of terminals with higher capabilities, or, for the type of terminals having higher performance requirement, or, for the terminals suitable for other new scenarios or new services. In some implementation manners, such terminals can also be classified into multiple types, and further independent access control is performed based on multiple pieces of indication information. In the following, multiple reduced capability terminal types can be controlled by using plurality pieces of first indication information. The device performs access control as an example for description, but the present application is not limited thereto.

In some embodiments, the multiple reduced capability terminal types are classified according to capabilities of terminal devices.

Optionally, the capability of the terminal device includes at least one of the following:

The bandwidth, transmission rate, number of antennas, storage capacity and power of the terminal device.

As an example, the reduced capability terminals may be classified into a first reduced capability terminal type, a second reduced capability terminal type, and a third reduced capability terminal type according to the capability of the terminal device, wherein the capabilities of the first reduced capability terminal type, the second reduced capability terminal type and the third reduced capability terminal type are successively reduced.

In some other embodiments, the multiple reduced capability terminal types may be classified according to application scenarios of the terminal device.

As an example but not a limitation, the multiple reduced capability terminal types may include, but not limited to, the reduced capability terminal types in the foregoing scenario 1, scenario 2, and scenario 3.

In some other embodiments, the multiple reduced capability terminal types may be classified according to the operating frequency band of the terminal device, for example, it may include a reduced capability terminal type operating in the first frequency band and a reduced capability terminal type operating in the second frequency band, the first frequency band may be, for example, a frequency band FR1, and the second frequency band may be, for example, a frequency band FR2.

It should be understood that the above-mentioned classification method of reduced capability terminal types is only an example. In other embodiments, it can also be classified based on other methods. The embodiment of the present application is not limited thereto. For example, the terminal devices capable of (or require) unified access control may be classified into a unified reduced capability terminal type.

In some embodiments, if the first indication information corresponding to the reduced capability terminal type to which the terminal device belongs indicates that access to the cell served by the network device is prohibited, it is determined that the terminal device is prohibited from accessing the cell served by the network device. Further, the terminal device may perform cell reselection.

In some other embodiments, if the first indication information corresponding to the reduced capability terminal type to which the terminal device belongs indicates that access to the cell served by the network device is not prohibited, it is determined that the terminal device is not prohibited from accessing the cell served by the network device.

Optionally, in some embodiments of the present application, the multiple pieces of first indication information may be sent through a system message.

That is, the terminal device can receive a system message sent by the network device, the system message includes the plurality pieces of first indication information, and further, the terminal device acquires the target first indication information in the plurality pieces of first indication information according to the reduced capability terminal type to which it belongs. At least one reduced capability terminal type corresponding to the target first indication information includes the reduced capability terminal type to which the terminal device belongs. Then, according to the indication of the target first indication information, it is determined whether to prohibit the terminal device to accesses the cell of the network device.

Optionally, in some embodiments of the present application, the system message may further include second indication information, wherein the second indication is used to indicate whether a non-reduced capability terminal is prohibited from accessing the cell served by the network device.

Optionally, in some embodiments, the non-reduced capability terminal may include a normal terminal, and the capability of the normal terminal is higher than that of the reduced capability terminal.

Hereinafter, a specific implementation process will be described with reference to the specific example shown in FIG. 5.

In this example, there may be three types of terminal with reduced capability, which are respectively recorded as: RedCaptype1, RedCaptype2 and RedCaptype3, and there may be three types of first indication information, which are respectively recorded as: Cellbarred_RedCaptype1, Cellbarred_RedCaptype2 and Cellbarred_RedCaptype3, corresponding to RedCaptype1, RedCaptype2 and RedCaptype3 respectively.

The network device broadcasts a system message, and the system message includes Cellbarred_RedCaptype1, Cellbarred_RedCaptype2, and Cellbarred_RedCaptype3, wherein the Cellbarred_RedCaptype1 indicates barred, Cellbarred_RedCaptype2 indicates not barred, and Cellbarred_RedCaptype3 indicates not barred.

Then, for UE1 belonging to RedCaptype1, it is considered that access to the cell of the network device is prohibited; for UE2 of RedCaptype2, it is considered that access to the cell of the network device is not prohibited; and for UE3 belonging to RedCaptype3, it is considered that access to the cell of the network device is not prohibited.

Optionally, in some embodiments of the present application, the network device may also indicate whether to prohibit a corresponding reduced capability terminal type from accessing the cell of the network device by whether the system message includes specific indication information.

Following the above example, if the system message includes the Cellbarred_RedCaptype1, it means that terminal devices of RedCaptype1 are prohibited from accessing the cell, and if the system message does not include the Cellbarred_RedCaptype1, it means that terminal devices of RedCaptype1 are not prohibited from accessing the cell; or, if the system message includes the Cellbarred_RedCaptype1, it means that the terminal device of RedCaptype1 is not prohibited from accessing the cell, and if the system message does not include the Cellbarred_RedCaptype1, it means that the terminal device of RedCaptype1 is prohibited from accessing the cell.

To sum up, in the embodiment of the present application, the terminal with reduced capability can be classified into multiple types of terminal with reduced capability, and further the network device can perform independent access control on the multiple types of terminal with reduced capability based on multiple pieces of indication information. It is beneficial to realize finer-grained access control for terminals with reduced capability.

Figure 6:
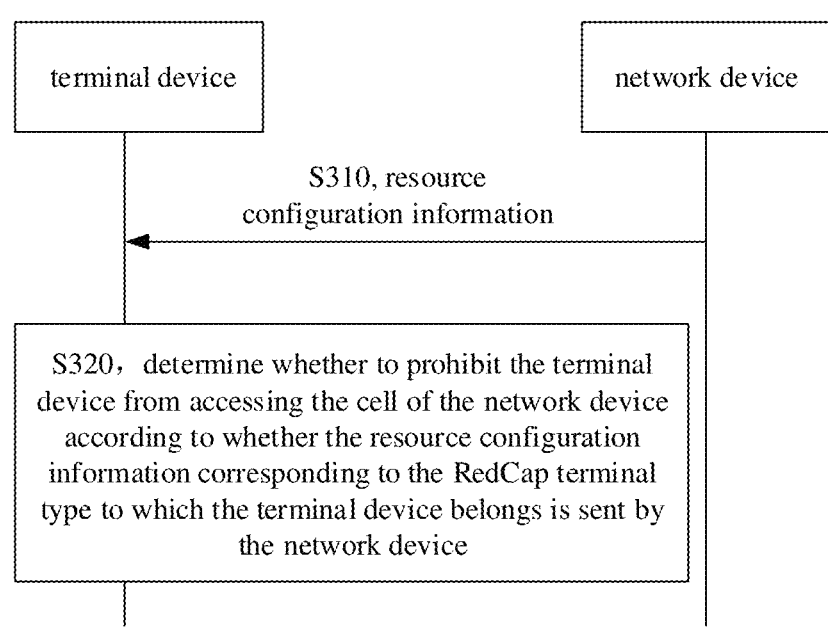
FIG. 6 is a schematic interaction diagram of another network access method according to an embodiment of the present application.

FIG. 6 is a schematic interaction diagram of a method 300 for accessing a network according to an embodiment of the present application. As shown in FIG. 6, the method 300 includes the following content:

S310. The network device indicates whether to prohibit the reduced capability terminal type corresponding to the resource configuration information from accessing the cell served by the network device by whether to send the resource configuration information; and S320. The terminal device determines whether to prohibit the terminal device from accessing the cell served by the network device according to whether the first resource configuration information sent by the network device is received.

In this embodiment, the reduced capability terminal can also be classified into multiple reduced capability terminal types. For the specific classification method and the specific description of the reduced capability terminal, refer to the embodiment shown in FIG. 4, and details are not repeated here for brevity.

In this embodiment, the multiple reduced capability terminal types may correspond to multiple pieces of resource configuration information, wherein each piece of resource configuration information in the multiple pieces of resource configuration information corresponds to at least one of the multiple reduced capability terminal types. The network device may indicate whether to prohibit the terminal device of the reduced capability terminal type from accessing the cell of the network device by sending or not sending the resource configuration information corresponding to the reduced capability terminal type.

In this embodiment of the present application, the terminal device is a terminal with reduced capability, the terminal device belongs to a first type of terminal with reduced capability among multiple terminal types with reduced capability, and the first resource configuration information is the resource configuration information corresponding to the first reduced capability terminal type. That is, the at least one reduced capability terminal type corresponding to the first resource configuration includes the first reduced capability terminal type. Therefore, the terminal device may determine whether to prohibit the terminal device from accessing the cell served by the network device according to whether the first resource configuration information is received.

As an example, if the first resource configuration information is received, it is determined that the terminal device is not prohibited from accessing the cell served by the network device.

As another example, if the first resource configuration information is not received, it is determined to prohibit the terminal device from accessing the cell served by the network device.

It should be understood that, in the embodiment of the present application, the resource configuration information may be information used for any resource configuration, which is not limited in the present application. As an example, the resource configuration information may be initial bandwidth part (BWP) configuration information, or may also be physical random access channel (PRACH) resource configuration information.

Optionally, in some embodiments, the multiple pieces of resource configuration information are sent by the system message.

Hereinafter, a specific implementation process will be described with reference to the specific examples shown in FIG. 7 and FIG. 8.

Figure 7:
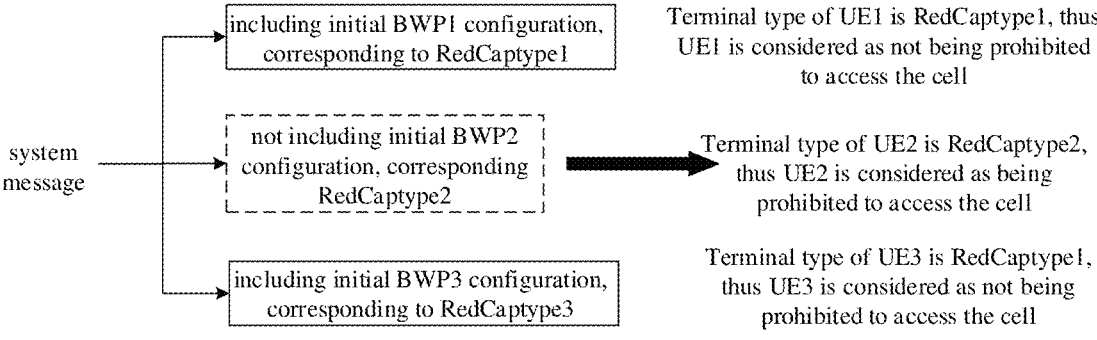
FIG. 7 to FIG. 8 are exemplary diagrams of the network access method shown in FIG. 6.

In the example shown in FIG. 7, there are three types of terminal with reduced capability, which are respectively recorded as: RedCaptype1, RedCaptype2 and RedCaptype3, and the multiple pieces of resource configuration information includes three initial BWP configurations, which are respectively recorded as: initial BWP1 configuration, initial BWP2 configuration and initial BWP3 configuration, corresponding to RedCaptype1, RedCaptype2 and RedCaptype3 respectively.

The network device broadcasts a system message, wherein the system message includes the initial BWP1 configuration and the initial BWP3 configuration, but does not include the initial BWP2 configuration.

For UE1 belonging to RedCaptype1, it is considered that access to the cell of the network device is not prohibited; for UE2 of RedCaptype2, it is considered that access to the cell of the network device is prohibited; and for UE3 of RedCaptype3, it is considered that access to the cell of the network device is not prohibited.

Figure 8:
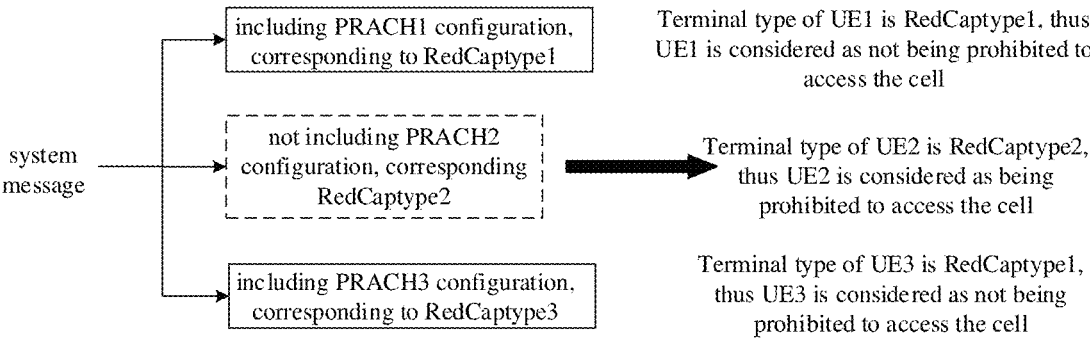

In the example shown in FIG. 8, there are three types of terminal with reduced capability, which are recorded as: RedCaptype1, RedCaptype2 and RedCaptype3, and the multiple pieces of resource configuration information includes three initial PRACH configurations, which are respectively recorded as: initial PRACH1 configuration, initial PRACH2 configuration and initial PRACH3 configuration, corresponding to RedCaptype1, RedCaptype2 and RedCaptype3 respectively.

The network device broadcasts a system message, wherein the system message includes the initial PRACH1 configuration and the initial PRACH3 configuration, but does not include the initial PRACH2 configuration.

For UE1 belonging to RedCaptype1, it is considered that access to the cell of the network device is not prohibited; for UE2 of RedCaptype2, it is considered that access to the cell of the network device is prohibited; and for UE3 of Red-Captype3, it is considered that access to the cell of the network device is not prohibited.

To sum up, in the embodiment of the present application, the reduced capability terminal can be classified into multiple reduced capability terminal types, and each reduced capability terminal type in the multiple reduced capability terminal types corresponds to one piece of resource configuration information in the plurality pieces of resource configuration information. Further, the network device can perform independent access control on the reduced capability terminal type by whether to send the resource configuration information corresponding to the reduced capability terminal type, which is beneficial to realize finer-grained access control for the terminal with reduced capability.

The method embodiment of the present application is described in detail above with reference to FIG. 4 to FIG. 8, and the device embodiment of the present application is described in detail below in conjunction with FIG. 9 to FIG. 15. It should be understood that the device embodiment and the method embodiment correspond to each other. Similar descriptions can refer to the method embodiments.

Figure 9:
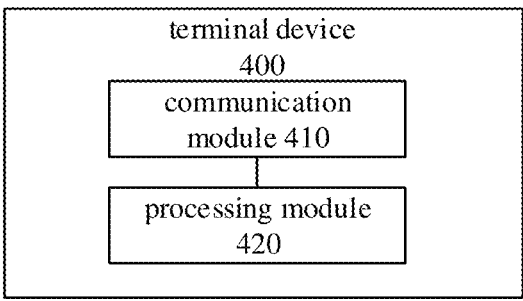
FIG. 9 is a schematic block diagram of a terminal device according to an embodiment of the present application.

FIG. 9 shows a schematic block diagram of a terminal device 400 according to an embodiment of the present application. As shown in FIG. 9, the terminal device 400 includes:

a communication unit 410, configured to receive a plurality pieces of first indication information sent by a network device, wherein each piece of first indication information in the plurality pieces of first indication information corresponds to at least one of a plurality of reduced capability terminal types, and each piece of first indication information is used to indicate whether the terminal device of a corresponding reduced capability terminal type is prohibited from accessing a cell served by the network device; and a processing unit 420, configured to determine whether to prohibit the terminal device from accessing the cell served by the network device according to the first indication information corresponding to the reduced capability terminal type to which the terminal device belongs.

Optionally, in some embodiment, the processing unit 420 is further configured to:

determine to prohibit the terminal device from accessing the cell served by the network device, if the first indication information corresponding to the reduced capability terminal type to which the terminal device belongs indicates that access to the cell served by the network device is prohibited; or determine not to prohibit the terminal device from accessing the cell served by the network device, if the first indication information corresponding to the reduced capability terminal type to which the terminal device belongs indicates that access to the cell served by the network device is not prohibited.

Optionally, in some embodiment, the plurality of reduced capability terminal types are classified according to capabilities of the terminal device, or according to operating frequency bands of the terminal device, or according to application scenarios of the terminal device.

Optionally, in some embodiment, the capability of the terminal device includes at least one of:

bandwidth, transmission rate, number of antennas, storage capacity and power of the terminal device.

Optionally, in some embodiment, the application scenario of the terminal device includes at least one of: industrial wireless sensors, video surveillance, and wearable scenarios.

Optionally, in some embodiment, the plurality pieces of first indication information are sent through a system message.

Optionally, in some embodiment, the system message is further used to send second indication information, and the second indication is used to indicate whether to prohibit a non-reduced capability terminal from accessing the cell served by the network device.

Optionally, in some embodiments, the above-mentioned communication unit may be a communication interface or a transceiver, or an input-output interface of a communication chip or a system-on-chip. The aforementioned processing unit may be one or more processors.

Figure 5:
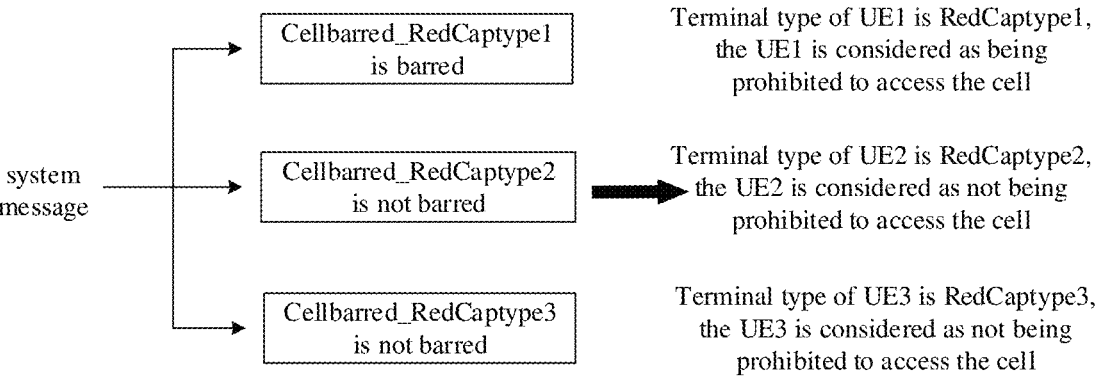
FIG. 5 is an example diagram of the network access method shown in FIG. 4.

It should be understood that the terminal device 400 according to the embodiment of the present application may correspond to the terminal device in the method embodiment of the present application, and the above-mentioned and other operations and/or functions of each unit in the terminal device 400 are to realize the corresponding process of the terminal device in the method 200 shown in FIG. 4 to FIG. 5, respectively. For the sake of brevity, it will not be repeated here.

FIG. 10 shows a schematic block diagram of a terminal device 500 according to an embodiment of the present application. As shown in FIG. 10, the terminal device 500 includes:

a processing unit 510, configured to determine whether to prohibit the terminal device from accessing a cell served by a network device according to whether first resource configuration information sent by the network device is received, wherein, the terminal device belongs to a first reduced capability terminal type among a plurality of reduced capability terminal types, the plurality of reduced capability terminal types correspond to a plurality pieces of resource configuration information, and each piece of resource configuration information in the plurality pieces of resource configuration information corresponds to at least one of the plurality of reduced capability terminal types, and the first resource configuration information is resource configuration information corresponding to the first reduced capability terminal type.

Optionally, in some embodiments, the processing unit 510 is further configured to:

determine not to prohibit the terminal device from accessing the cell served by the network device if the first resource configuration information is received; or determine to prohibit the terminal device from accessing the cell served by the network device if the first resource configuration information is not received.

Optionally, in some embodiments, the resource configuration information is used to configure an initial bandwidth part BWP, or used to configure a physical random access channel PRACH resource.

Optionally, in some embodiments, the plurality of reduced capability terminal types are classified according to capabilities of the terminal device, or according to operating frequency bands of the terminal device, or according to application scenarios of the terminal device.

Optionally, in some embodiments, the capability of the terminal device includes at least one of:

bandwidth, transmission rate, number of antennas, storage capacity and power of the terminal device.

Optionally, in some embodiments, the application scenario of the terminal device includes at least one of: industrial wireless sensors, video surveillance, and wearable scenarios.

Optionally, in some embodiments, the plurality pieces of indication information are sent through a system message.

Optionally, in some embodiments, the above-mentioned communication unit may be a communication interface or a transceiver, or an input-output interface of a communication chip or a system-on-chip.

It should be understood that the terminal device 500 according to the embodiment of the present application may correspond to the terminal device in the method embodiment of the present application, and the above-mentioned and other operations and/or functions of each unit in the terminal device 500 are to realize the corresponding process of the terminal device in the method 300 shown in FIG. 6 to FIG. 8, respectively. For the sake of brevity, it will not be repeated here.

FIG. 11 is a schematic block diagram of a network device according to an embodiment of the present application. The network device 600 of FIG. 11 includes:

a communication unit 610, configured to send a plurality pieces of first indication information, wherein each piece of first indication information in the plurality pieces of first indication information corresponds to at least one of a plurality of reduced capability terminal types, and the first indication information is used to indicate whether a terminal device of a corresponding reduced capability terminal type is prohibited from accessing a cell served by the network device.

Optionally, in some embodiments, the communication unit 610 is further configured to:

send a system message, wherein the system message includes the plurality pieces of first indication information.

Optionally, in some embodiments, the system message further includes second indication information, and the second indication is used to indicate whether a non-reduced capability terminal is prohibited from accessing the cell served by the network device.

Optionally, in some embodiments, the plurality of reduced capability terminal types are classified according to capabilities of the terminal device, or according to operating frequency bands of the terminal device, or according to application scenarios of the terminal device.

Optionally, in some embodiments, the capability of the terminal device includes at least one of:

bandwidth, transmission rate, number of antennas, storage capacity and power of the terminal device.

Optionally, in some embodiments, the application scenario of the terminal device includes at least one of: industrial wireless sensors, video surveillance, and wearable scenarios.

Optionally, in some embodiments, the above-mentioned communication unit may be a communication interface or a transceiver, or an input-output interface of a communication chip or a system-on-chip.

It should be understood that the network device 600 according to the embodiment of the present application may correspond to the network device in the method embodiment of the present application, and the above-mentioned and other operations and/or functions of each unit in the network device 600 are to realize the corresponding process of the network device in the method 200 shown in FIG. 4 to FIG. 5, respectively. For the sake of brevity, it will not be repeated here.

FIG. 12 is a schematic block diagram of a network device according to an embodiment of the present application. The network device 700 of FIG. 12 includes:

a processing unit 710, configured to indicate whether to prohibit a terminal device of a first reduced capability terminal type from accessing a cell served by the network device by sending or not sending first resource configuration information, wherein the first resource configuration information is one of a plurality pieces of resource configuration information, the plurality pieces of resource configuration information correspond to a plurality of reduced capability terminal types, and each piece of resource configuration information in the plurality pieces of resource configuration information corresponds to at least one of the plurality of reduced capability terminal types, and the first resource configuration information is resource configuration information corresponding to the first reduced capability terminal type.

Optionally, in some embodiments, the network device sends the first resource configuration information to indicate that the terminal device of the first reduced capability terminal type is not prohibited from accessing the cell served by the network device;

the network device does not send the first resource configuration information to indicate that the terminal device of the first reduced capability terminal type is prohibited from accessing the cell served by the network device.

Optionally, in some embodiments, the resource configuration information is used to configure an initial bandwidth part BWP, or used to configure a physical random access channel PRACH resource.

Optionally, in some embodiments, the plurality of reduced capability terminal types are classified according to capabilities of the terminal device, or according to operating frequency bands of the terminal device, or according to application scenarios of the terminal device.

Optionally, in some embodiments, the capability of the terminal device includes at least one of:

bandwidth, transmission rate, number of antennas, storage capacity and power of the terminal device.

Optionally, in some embodiments, the application scenario of the terminal device includes at least one of: industrial wireless sensors, video surveillance, and wearable scenarios.

Optionally, in some embodiments, wherein the plurality pieces of indication information are sent through a system message.

Optionally, in some embodiments, the above-mentioned communication unit may be a communication interface or a transceiver, or an input-output interface of a communication chip or a system-on-chip.

It should be understood that the network device 700 according to the embodiment of the present application may correspond to the network device in the method embodiment of the present application, and the above-mentioned and other operations and/or functions of each unit in the network device 700 are to realize the corresponding process of the network device in the method 300 shown in FIG. 6 to FIG. 8, respectively. For the sake of brevity, it will not be repeated here.

Figure 13:
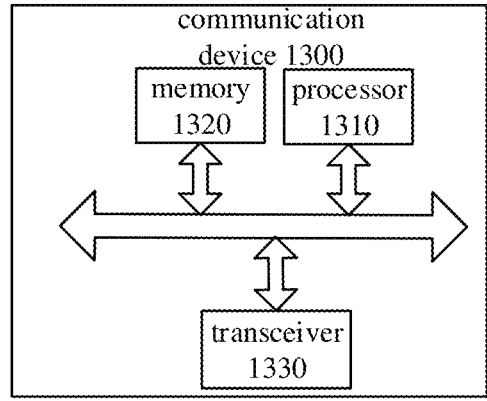
FIG. 13 is a schematic block diagram of a communication device provided according to an embodiment of the present application.

FIG. 13 is a schematic structural diagram of a communication device 1300 provided by an embodiment of the present application. The communication device 1300 shown in FIG. 13 includes a processor 1310, and the processor 1310 can invoke and run a computer program from a memory, so as to implement the method in the embodiment of the present application.

Optionally, as shown in FIG. 13, the communication device 1300 may further include a memory 1320. Wherein, the processor 1310 can invoke and run a computer program from the memory 1320, so as to implement the method in the embodiment of the present application.

The memory 1320 may be an independent device independent of the processor 1310, or may be integrated in the processor 1310.

Optionally, as shown in FIG. 13, the communication device 1300 may further include a transceiver 1330, and the processor 1310 may control the transceiver 1330 to communicate with other devices, specifically, to send information or data to other devices, or receive information or data sent by other devices.

The transceiver 1330 may include a transmitter and a receiver. The transceiver 1330 may further include an antenna(s), and the number of the antenna may be one or more.

Optionally, the communication device 1300 may be the network device of the embodiment of the present application, and the communication device 1300 may implement the corresponding processes implemented by the network device in the methods of the embodiment of the present application. For the sake of brevity, it will not be repeated herein.

Optionally, the communication device 1300 may be the mobile terminal/terminal device, and the communication device 1300 may implement the corresponding processes implemented by the method provided by mobile terminal/terminal device in the embodiments of the present application. For the sake of brevity, it will not be repeated herein.

Figure 14:
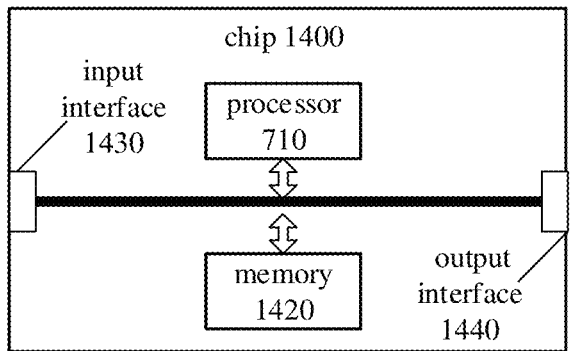
FIG. 14 is a schematic block diagram of a chip provided according to an embodiment of the present application.

FIG. 14 is a schematic structural diagram of a chip 1400 according to an embodiment of the present application. The chip 1400 shown in FIG. 14 includes a processor 1410, and the processor 1410 can invoke and run a computer program from a memory, so as to implement the method in the embodiment of the present application.

Optionally, as shown in FIG. 14, the chip 1400 may further include a memory 1420. The processor 1410 may invoke and run a computer program from the memory 1420, so as to implement the method in the embodiment of the present application.

The memory 1420 may be an independent device independent of the processor 1410, or may be integrated in the processor 1410.

Optionally, the chip 1400 may also include an input interface 1430. The processor 1410 can control the input interface 1430 to communicate with other devices or chips, specifically, can obtain information or data sent by other devices or chips.

Optionally, the chip 1400 may also include an output interface 1440. The processor 1410 can control the output interface 1440 to communicate with other devices or chips, specifically, can output information or data to other devices or chips.

Optionally, the chip can be applied to the network device in the embodiments of the present application, and the chip can implement the corresponding processes implemented by the network device in the methods of the embodiments of the present application. For the sake of brevity, it will not be repeated herein.

Optionally, the chip can be applied to the mobile terminal/terminal device, and the chip can implement the corresponding processes implemented by the mobile terminal/terminal device in the methods of the embodiments of the present application. For the sake of brevity, it will not be repeated herein.

It should be understood that the chip mentioned in the embodiment of the present application may also be referred to as a system level chip, a system chip, a chip system or a system-on-chip.

Figure 15:
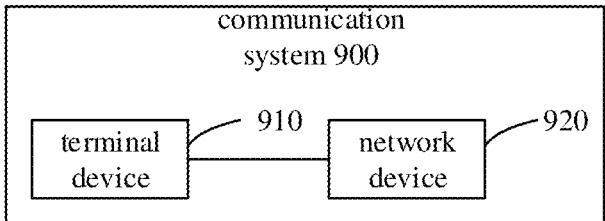
FIG. 15 is a schematic block diagram of a communication system provided according to an embodiment of the present application.

FIG. 15 is a schematic block diagram of a communication system 900 provided by an embodiment of the present application. As shown in FIG. 15, the communication system 900 includes a terminal device 910 and a network device 920.

The terminal device 910 can be used to realize the corresponding functions realized by the terminal device in the above method, and the network device 920 can be used to realize the corresponding functions realized by the network device in the above method. For the sake of brevity, it will not be repeated herein.

It should be understood that the processor in the embodiment of the present application may be an integrated circuit chip, which has a signal processing capability. In the implementation process, each step of the above-mentioned method embodiments may be completed by an integrated logic circuit of hardware in a processor or instructions in the form of software. The above-mentioned processor may be a general-purpose processor, a digital signal processor (DSP), an application specific integrated circuit (ASIC), a field programmable gate array (FPGA) or other programmable logic devices, discrete gate or transistor logic devices, discrete hardware components. Various methods, steps, and logic block diagrams disclosed in the embodiments of the present application may be implemented or executed. The general-purpose processor may be a microprocessor, or the processor may be any conventional processor, or the like. The steps of the method disclosed in connection with the embodiments of the present application may be directly implemented by a hardware decoding processor, or implemented by a combination of hardware and software modules in the decoding processor. The software module can be located in a mature storage medium in the field such as random access memory, flash memory, read-only memory, programmable read-only memory or electrically erasable programmable memory, or register. The storage medium is located in the memory, and the processor reads the information in the memory, and completes the steps of the above method in combination with its hardware.

It can be understood that the memory in the embodiments of the present application may be a volatile memory or a nonvolatile memory, or may include both volatile and non-volatile memories. Among them, the non-volatile memory can be read-only memory (ROM), programmable read-only memory (PROM), erasable programmable read-only memory (Erasable PROM, EPROM), electrically programmable Erase Programmable Read-Only Memory (Electrically EPROM, EEPROM) or Flash. The volatile memory may be Random Access Memory (RAM), which acts as an external cache. By way of illustration and not limitation, many forms of RAM are available such as Static RAM (SRAM), Dynamic RAM (DRAM), Synchronous DRAM (SDRAM), double data rate synchronous dynamic random access memory (Double Data Rate SDRAM, DDR SDRAM), enhanced synchronous dynamic random access memory (Enhanced SDRAM, ESDRAM), synchronous connection dynamic random access memory (Synchlink DRAM, SLDRAM) and Direct Memory Bus Random Access Memory (Direct Rambus RAM, DR RAM). It should be noted that the memory of the systems and methods described herein is intended to include, but not be limited to, these and any other suitable types of memory.

It should be understood that the above-mentioned memory is illustrative but not restrictive. For example, the memory in the embodiment of the present application may also be a static random access memory (static RAM, SRAM), a dynamic random access memory (dynamic RAM, DRAM), Synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synchronous connection Dynamic random access memory (synch link DRAM, SLDRAM) and direct memory bus random access memory (Direct Rambus RAM, DR RAM), etc. That is, the memory in the embodiments of the present application is intended to include, but not be limited to, these and any other suitable types of memory.

The embodiment of the present application also provides a computer-readable storage medium for storing computer programs.

Optionally, the computer-readable storage medium can be applied to the network device in the embodiments of the present application, and the computer program enables the computer to execute the corresponding processes implemented by the network device in the methods of the embodiments of the present application. For brevity, it will not be repeated herein.

Optionally, the computer-readable storage medium can be applied to the mobile terminal/terminal device in the embodiments of the present application, and the computer program enables the computer to execute the corresponding processes implemented by the mobile terminal/terminal device in the various methods of the embodiments of the present application, for the sake of brevity, it is not repeated here.

The embodiment of the present application also provides a computer program product, including computer program instructions.

Optionally, the computer program product may be applied to the network device in the embodiment of the present application, and the computer program instructions cause the computer to execute the corresponding process implemented by the network device in each method of the embodiment of the present application. For the sake of brevity, the details are not repeated here.

Optionally, the computer program product can be applied to the mobile terminal/terminal device in the embodiments of the present application, and the computer program instructions cause the computer to execute the corresponding processes implemented by the mobile terminal/terminal device in the methods of the embodiments of the present application, For the sake of brevity, details are not repeated here.

The embodiment of the present application also provides a computer program.

Optionally, the computer program can be applied to the network device in the embodiment of the present application. When the computer program is run on the computer, the computer executes the corresponding process implemented by the network device in each method of the embodiment of the present application. For the sake of brevity, it will not be repeated here.

Optionally, the computer program can be applied to the mobile terminal/terminal device in the embodiment of the present application. When the computer program is run on the computer, the computer executes each method in the embodiment of the present application to be implemented by the mobile terminal/terminal device. For the sake of brevity, the corresponding process will not be repeated here.

Those skilled in the art can appreciate that the units and algorithm steps of the examples described in conjunction with the embodiments disclosed herein can be implemented by electronic hardware, or a combination of computer software and electronic hardware. Whether these functions are executed by hardware or software depends on the specific application and design constraints of the technical solution. Those skilled in the art may use different methods to implement the described functions for each specific application, but such implementation should not be regarded as exceeding the scope of the present application.

Those skilled in the art can clearly understand that for the convenience and brevity of the description, the specific operating process of the above-described system, device and unit can refer to the corresponding process in the foregoing method embodiment, which will not be repeated here.

In the several embodiments provided in this application, it should be understood that the disclosed systems, devices and methods may be implemented in other ways. For example, the device embodiments described above are only illustrative. For example, the division of the units is only a logical function division. In actual implementation, there may be other division methods. For example, multiple units or components can be combined or may be integrated into another system, or some features may be ignored, or not implemented. In another point, the mutual coupling or direct coupling or communication connection shown or discussed may be through some interfaces, and the indirect coupling or communication connection of devices or units may be in electrical, mechanical or other forms.

The units described as separate components may or may not be physically separated, and the components shown as units may or may not be physical units, that is, they may be located in one place, or may be distributed to multiple network units. Part or all of the units can be selected according to actual needs to achieve the purpose of the solution of this embodiment.

In addition, each functional unit in each embodiment of the present application may be integrated into one processing unit, each unit may exist separately physically, or two or more units may be integrated into one unit.

If the functions described above are realized in the form of software function units and sold or used as independent products, they can be stored in a computer-readable storage medium. Based on this understanding, the technical solution of the present application is essentially or the part that contributes to the prior art or the part of the technical solution can be embodied in the form of a software product, and the computer software product is stored in a storage medium, including several instructions that are used to make a computer device (which may be a personal computer, a server, or a network device, etc.) execute all or part of the steps of the methods described in the various embodiments of the present application. The aforementioned storage media include: U disk, mobile hard disk, read-only memory (ROM), random access memory (RAM), magnetic disk or optical disk and other media that can store program codes.

The above is only a specific implementation of the application, but the scope of protection of the application is not limited thereto. Anyone familiar with the technical field can easily think of changes or substitutions within the technical scope disclosed in the application. Should be covered within the protection scope of this application. Therefore, the protection scope of the present application should be based on the protection scope of the claims.

What is claimed is:

1. A network access method, comprising:
receiving, by a terminal device, a plurality pieces of first indication information sent by a network device, wherein each piece of first indication information in the plurality pieces of first indication information corresponds to at least one of a plurality of reduced capability terminal types, and each piece of first indication information is used to indicate whether the terminal device of a corresponding reduced capability terminal type is prohibited from accessing a cell served by the network device; and
determining, by terminal device, whether to prohibit the terminal device from accessing the cell served by the network device according to the first indication information corresponding to the reduced capability terminal type to which the terminal device belongs,
wherein the determining, by terminal device, whether to prohibit the terminal device from accessing the cell served by the network device according to the first indication information corresponding to the reduced capability terminal type to which the terminal device belongs, comprises:
determining to prohibit the terminal device from accessing the cell served by the network device, if the first indication information corresponding to the reduced capability terminal type to which the terminal device belongs indicates that access to the cell served by the network device is prohibited,
wherein the plurality of reduced capability terminal types are classified according to number of antennas of the terminal device.

2. The method according to claim 1, wherein the determining, by terminal device, whether to prohibit the terminal device from accessing the cell served by the network device according to the first indication information corresponding to the reduced capability terminal type to which the terminal device belongs, further comprises:
determining not to prohibit the terminal device from accessing the cell served by the network device, if the first indication information corresponding to the reduced capability terminal type to which the terminal device belongs indicates that access to the cell served by the network device is not prohibited.

3. The method according to claim 1, wherein the plurality of reduced capability terminal types are classified according to capabilities of the terminal device, or according to operating frequency bands of the terminal device, or according to application scenarios of the terminal device.

4. The method according to claim 3, wherein the capabilities of the terminal device comprise at least one of:
bandwidth, transmission rate, the number of antennas, storage capacity and power of the terminal device.

5. The method according to claim 3, wherein the application scenarios of the terminal device comprise at least one of: industrial wireless sensors, video surveillance, and wearable scenarios.

6. The method according to claim 1, wherein the plurality pieces of first indication information are sent through a system message.

7. The method according to claim 6, wherein the system message is further used to send second indication information, and the second indication is used to indicate whether to prohibit a non-reduced capability terminal from accessing the cell served by the network device.

8. A network access method, comprising:
sending, by a network device, a plurality pieces of first indication information, wherein each piece of first indication information in the plurality pieces of first indication information corresponds to at least one of a plurality of reduced capability terminal types, and the first indication information is used to indicate whether a terminal device of a corresponding reduced capability terminal type is prohibited from accessing a cell served by the network device,
wherein the first indication information corresponding to the reduced capability terminal type to which the terminal device belongs indicates that access to the cell served by the network device is prohibited, to prohibit the terminal device from accessing the cell served by the network device,
wherein the plurality of reduced capability terminal types are classified according to number of antennas of the terminal device.

9. The method according to claim 8, wherein the sending, by the network device, the plurality pieces of first indication information, comprises:
sending, by the network device, a system message, wherein the system message comprises the plurality pieces of first indication information.

10. The method according to claim 9, wherein the system message further comprises second indication information, and the second indication is used to indicate whether a non-reduced capability terminal is prohibited from accessing the cell served by the network device.

11. The method according to claim 8, wherein the plurality of reduced capability terminal types are classified according to capabilities of the terminal device, or according to operating frequency bands of the terminal device, or according to application scenarios of the terminal device.

12. The method according to claim 11, wherein the capabilities of the terminal device comprise at least one of: bandwidth, transmission rate, the number of antennas, storage capacity and power of the terminal device.

13. The method according to claim 11, wherein the application scenarios of the terminal device comprise at least one of: industrial wireless sensors, video surveillance, and wearable scenarios.

14. A terminal device, comprising a processor and a memory, wherein the memory is configured to store a computer program, and the processor is configured to call and run the computer program stored in the memory, to:
receive a plurality pieces of first indication information sent by a network device, wherein each piece of first indication information in the plurality pieces of first indication information corresponds to at least one of a plurality of reduced capability terminal types, and each piece of first indication information is used to indicate whether the terminal device of a corresponding reduced capability terminal type is prohibited from accessing a cell served by the network device; and
determine whether to prohibit the terminal device from accessing the cell served by the network device according to the first indication information corresponding to the reduced capability terminal type to which the terminal device belongs, wherein the processor is further configured to:

determine to prohibit the terminal device from accessing the cell served by the network device, if the first indication information corresponding to the reduced capability terminal type to which the terminal device belongs indicates that access to the cell served by the network device is prohibited, wherein the plurality of reduced capability terminal types are classified according to number of antennas of the terminal device.

15. The terminal device according to claim 14, wherein the processor is further configured to:

determine not to prohibit the terminal device from accessing the cell served by the network device, if the first indication information corresponding to the reduced capability terminal type to which the terminal device belongs indicates that access to the cell served by the network device is not prohibited.

16. The terminal device according to claim 14, wherein the plurality of reduced capability terminal types are classified according to capabilities of the terminal device, or according to operating frequency bands of the terminal device, or according to application scenarios of the terminal device.

17. The terminal device according to claim 16, wherein the capabilities of the terminal device comprise at least one of:

bandwidth, transmission rate, the number of antennas, storage capacity and power of the terminal device.

18. The terminal device according to claim 16, wherein the application scenarios of the terminal device comprise at least one of: industrial wireless sensors, video surveillance, and wearable scenarios.

19. The terminal device according to claim 14, wherein the plurality pieces of first indication information are sent through a system message.

20. A network device, comprising: a processor and a memory, wherein the memory is configured to store a computer program, and the processor is configured to call and run the computer program stored in the memory, to execute the method according to claim 8.

* * * * *